UNITED STATES PATENT OFFICE 2,502,130

PREPARATION OF MAGNESIUM FERRITE PIGMENT

Charles D. Downs, Newtown, Pa., and John Martin, Trenton, N. J., assignors to Columbian Carbon Company, New York, N. Y., a corporation of Delaware No Drawing. Application August 29, 1947, Serial No. 771,382

8 Claims. (Cl. 23—50)

This invention relates to the production of magnesium ferrite and particularly to an improved method of preparing this material.

Iron oxide pigments have been known for many years and have a wide variety of uses. Such pigments, except red iron oxides, are subject to color changes when heated above about 200° C. and are subject, therefore, to certain limitations in use.

It is the object of the present invention to provide pigment materials, of color other than red, which are not subject to color changes at high temperatures and are therefore useful for purposes for which iron oxide pigments are not now available.

Another object of the invention is the provision of an improved method of preparing such pigments.

Other objects and advantages of the invention will be apparent as it is better understood by reference to the following specification, in which the preferred embodiments of the invention are described.

Magnesium ferrite may be prepared by mixing synthetic ferric oxide, ferric oxide hydrate or ferro-ferric oxide with magnesium oxide or magnesium carbonate and water, stirring to form a thick paste, drying in an oven at 110° C. and thereafter calcining the material in the form of lumps or fine powder. However, upon heating to temperatures up to 1050° C. for two hours or more, the reaction is still incomplete and the product contains unreacted ferric oxide which gives the product an undesirable color.

We have discovered that the addition of a suitable catalyst to a mixture containing substantially stoichiometric amounts of an iron oxide and either magnesium oxide or magnesium carbonate causes complete reaction at lower temperature and in a much shorter time. Thus, for example, the addition of magnesium chloride to the mixture in amounts less than 0.2% of the total weight causes the reaction to be complete after heating for 30 minutes at a temperature of 950° C. The magnesium chloride is completely decomposed and is not present in the product. The latter can be ground to a fine powder.

The product is a buff-colored product suitable for use as a pigment, and the color does not change when the material is heated to temperatures above 200° C. Hence the product is suitable for purposes for which iron oxide pigments have not been available.

The following examples will illustrate the procedure:

Example 1

Sufficient yellow iron oxide filter pulp (28%–35% solids) to give 178 lbs. of dry $Fe_2O_3.H_2O$ is weighted into a suitable vessel equipped with a mechanical stirrer. The stirrer is started and 84.5 lbs. of dry magnesium carbonate is added along with about 10 gallons of water in which 2.8 lbs. of $MgCl_2.6H_2O$ has been dissolved.

After the paste is thoroughly stirred and a homogeneous mixture obtained, the stirrer is cut off and a paste transferred to shallow pans and dried at 110° C.

The dried lumps are put in a furnace and calcined 30 minutes at 950° C.

After calcining the lumps are ground to a fine powder in a mill.

Example 2

Sufficient black iron oxide filter pulp (50–65% solids) to give 160 lbs. of dry $Fe_2O_3$ is weighed into a suitable vessel equipped with a mechanical stirrer. The stirrer is started and 40.5 lbs. of magnesium oxide is added along with about 4 gallons of water in which 2.2 lbs. of $MgCl_2.6H_2O$ has been dissolved.

After the paste is thoroughly stirred and a homogeneous mixture obtained the stirrer is cut off and the paste transferred to shallow pans and dried at 110° C.

The dried lumps are pulverized in a mill, then calcined 30 minutes at 950° C. in a suitable furnace, and, after calcining, the lumps are ground to a fine powder in a mill.

The temperature specified in the foregoing examples is not critical. It may vary from 900 to 1100° C. and the time of heating may be varied from 30 to 60 minutes or longer.

Although we have found magnesium chloride to be an excellent catalyst for the purpose, other halide salts such as the chlorides and bromides of calcium, iron, zinc and sodium may be used instead.

Various changes may be made in the procedure as described without departing from the invention or sacrificing the advantages thereof.

We claim:

1. The method of preparing magnesium ferrite pigments which comprises heating a mixture containing substantially stoichiometric amounts of an iron oxide and a magnesium compound of the class consisting of the oxides and carbonates in the presence of a catalyst consisting of a halide salt which promotes the reaction.

2. The method of preparing magnesium ferrite pigments which comprises heating a mixture containing substantially stoichiometric amounts of an iron oxide and a magnesium compound of the class consisting of the oxides and carbonates in the presence of a catalyst which promotes the reaction at a temperature of from 900 to 1100° C.

3. The method of preparing magnesium ferrite pigments which comprises heating a mixture containing substantially stoichiometric amounts of an iron oxide and a magnesium compound of the class consisting of the oxides and carbonates in the presence of a catalyst which promotes the reaction at a temperature of about 950° C.

4. The method of preparing magnesium ferrite pigments which comprises heating a mixture containing substantially stoichiometric amounts of an iron oxide and a magnesium compound of the class consisting of the oxides and carbonates in the presence of a catalyst consisting of a halide salt which promotes the reaction at a temperature of from 900 to 1100° C.

5. The method of preparing magnesium ferrite pigments which comprises heating a mixture containing substantially stoichiometric amounts of an iron oxide and a magnesium compound of the class consisting of the oxides and carbonates in the presence of a catalyst consisting of a halide salt which promotes the reaction to a temperature of about 950° C.

6. The method of preparing magnesium ferrite pigments which comprises heating a mixture containing substantially stoichiometric amounts of an iron oxide and a magnesium compound of the class consisting of the oxides and carbonates in the presence of magnesium chloride.

7. The method of preparing magnesium ferrite pigments which comprises heating a mixture containing substantially stoichiometric amounts of an iron oxide and a magnesium compound of the class consisting of the oxides and carbonates in the presence of magnesium chloride which promotes the reaction at a temperature of from 900 to 1100° C.

8. The method of preparing magnesium ferrite pigments which comprises heating a mixture containing substantially stoichiometric amounts of an iron oxide and a magnesium compound of the class consisting of the oxides and carbonates in the presence of magnesium chloride which promotes the reaction to a temperature of about 950° C.

CHARLES D. DOWNS.
JOHN MARTIN.

REFERENCES CITED

The following references are of record in the file of this patent:

UNITED STATES PATENTS

| Number | Name | Date |
| --- | --- | --- |
| 1,979,595 | Wood | Nov. 6, 1934 |
| 2,105,670 | Perkins | Jan. 18, 1938 |

OTHER REFERENCES

H. G. Fisk and W. J. McCaughey, Bull. Ohio Univ. Exp. Station, 70, 1932.